United States Patent [19]

Itoh et al.

[11] 3,876,605

[45] Apr. 8, 1975

[54] CURABLE SILICONE RUBBER COMPOSITIONS

[75] Inventors: Kunio Itoh; Naohiko Harada, both of Annaka; Naoyuki Tamura, Takaski; Toshihiko Abe, Yokohama; Shichiro Kawawata; Yukio Shimazaki, both of Hitachi, all of Japan

[73] Assignee: Shinetsu Chemical Company, Tokyo, Japan

[22] Filed: Nov. 19, 1973

[21] Appl. No.: 416,790

[30] Foreign Application Priority Data
Nov. 22, 1972  Japan .............................. 47-116558

[52] U.S. Cl. ............................................ 260/37 SB
[51] Int. Cl. .............................................. C08g 51/04
[58] Field of Search ................................. 260/37 SB

[56] References Cited
UNITED STATES PATENTS 3,341,489  9/1967  Simpson ......................... 260/37 SB
3,629,359  12/1971  Nitzsche et al. .............. 260/37 SB X

*Primary Examiner*—Lewis T. Jacobs
*Attorney, Agent, or Firm*—Toren, McGeady and Stanger

[57] ABSTRACT

Curable silicone rubber compositions comprising (1) diorganopolysiloxane gum containing phenyl groups at a ratio of from 0.1 to 1.0 per silicon atom and vinyl groups at a ratio of from 0.001 to 0.05 per silicon atom in its molecules, (2) a cyclic phenylvinyl polysiloxane, (3) a reinforcing silica filler treated with an organosilane or siloxane, having silicon-bonded hydroxyl or hydrolyzable groups, and (4) an organic peroxide as the curing agent. Organosiloxane elastomers prepared from these materials are characterized by unusually high radiation resistance and mechanical strengths.

10 Claims, No Drawings

CURABLE SILICONE RUBBER COMPOSITIONS

FIELD OF THE INVENTION

This invention relates to novel silicone rubber compositions. More particularly, the invention relates to silicone rubber compositions which are curable to produce organosiloxane elastomers having unusually high radiation resistance and mechanical strengths.

DESCRIPTION OF THE PRIOR ART

Organopolysiloxane elastomers in general are widely used because of their superior heat and cold resistance, weathering resistance and electrical properties. They, however, become remarkably deteriorated to cease functioning as rubbery elastic bodies, when irradiated by electron beam or γ-rays, even though such radiation dose is as small as 50 Mrad. Therefore, they are not suitable as electric insulators to be used on nuclear reactors or machinery exposed to strong ionizing radiation. In order to overcome such disadvantages, it was proposed for the purpose to use phenylmethypolysiloxane elastomers having a relatively high phenyl content instead of traditional dimethylpolysiloxane elastomers.

In fact, the phenylmethypolysiloxane elastomers possess improved radiation resistance. However, they are much inferior in curability, and exhibit remarkably low resilient elasticity and mechanical strengths.

SUMMARY OF THE INVENTION

The present invention is intended to provide novel silicone rubber compositions having high radiation resistance and mechanical strengths free from the above-described disadvantages. The silicone rubber composition according to the invention consists essentially of the following ingredients.

1. 100 parts by weight of an organopolysiloxane having a polymerization degree of at least 1,000, represented by the average formula

where $R^1$ is a monovalent hydrocarbon group, of which from 0.1 to 1.0 group per silicon atom is phenyl or halogenated phenyl, from 0.001 to 0.05 group per silicon atom is vinyl and the other group is alkyl, and a is a number of from 1.98 to 2.0, 2. from 0.5 to 20 parts by weight of a cyclic organopolysiloxane represented by the general formula

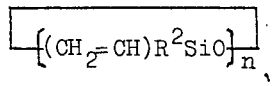

where $R^2$ is a phenyl or halogenated phenyl group and $n$ is an integer of from 3 to 6, 3. from 10 to 200 parts by weight of a silica filler having a specific surface area of at least 50 m²/g, the surface of which is treated with an organosilicon compound having the general formula

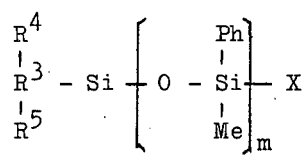

where $R^3$, $R^4$ and $R^5$ are the same or different saturated monovalent hydrocarbon groups, at least one of the $R^3$, $R^4$ and $R^5$ being a phenyl or halogenated phenyl group, Ph stands for phenyl, Me for methyl, m is an integer of from 0 to 10 and X is a hydroxyl or hydrolyzable group, and 4. a catalytic amount of an organic peroxide.

The organopolysiloxane being ingredient (1) of the composition of the invention has a polymerization degree of at least 1,000 and is represented by the average formula $$R^1_a SiO_{4-a/2}$$

where $R^1$ as defined before is required to contain phenyl or halogenated phenyl groups and vinyl groups in certain amounts in the molecules.

Speaking of the phenyl groups, if they are contained too little, the resulting products would have an insufficient radiation resistant property and, on the other hand, if too much, no sufficient curability would be obtained, to produce elastomers having inferior elasticity and mechanical properties. Consequently, the phenyl content in the organopolysiloxane should be as much as from 0.1 to 1.0 in terms of phenyl or halogenated phenyl group per silicon atom in the molecules.

Speaking further of the vinyl content, it should be in the range of from 0.001 to 0.05 in terms of vinyl group per silicon atom in the molecules. If it is less than that, no sufficient cross-linkages with ingredient (2) could be obtained, while, if it is more, it would adversely affect the tensile strength and elongation at break as well as elasticity and radiation resistance of the resulting products.

The other groups than the phenyl and vinyl groups in ingredient (1) are alkyl, such as methyl, ethyl or propyl, among which methyl groups are most predominant.

The organopolysiloxane of ingredient (1) can be prepared by various methods. One example of the methods is to mix any ones of cyclic dimethylpolysiloxane, cyclic diphenylpolysiloxane, cyclic phenylmethylpolysiloxane and cyclicmethylvinylpolysiloxane in ratios such that the resulting organopolysiloxane will contain the phenyl, vinyl and alkyl groups in the above-defined amounts and the mixture is heated in the presence of an alkali catalyst such as potassium hydroxide so that the ring-opening polymerization of the cyclic siloxanes takes place, and the resulting product is then subjected to neutralization.

Ingredient (2) being cyclic phenylvinylpolysiloxane is the most critical ingredient in the invention. The cyclic phenylvinylpolysiloxane having a cyclic structure helps a great deal to improve the curing effect at its cross-linking reactions with ingredient (1), as compared to the case where a compound of linear structure is employed. Furthermore, it containing no methyl group, which hardly works to effect radiation resistance, is used for the purpose of improving the radiation resistance of the resulting elastomers.

The polymerization degree of the cyclic phenylvinylpolysiloxane should be between 3 and 6. If it is larger than 6, such high molecular weight would cause steric hindrance, helping to lessen the crosslinking efficiency and strengthen the binding force of the unvulcanized rubber, which will result in lowering the elongation of the product. Further, if the amount of this ingredient (2) is smaller than 0.5% of that of ingredient (1), its curing efficiency would be reduced, and the mechanical strengths of the cured elastomers would be low. On the other hand, if it is larger than 20% of that of ingredient (1), there would occur too many cross-linkages, and the cured products would lose its elasticity, due to reduced degrees of elongation. Consequently, the amount of ingredient (2) is required to be from 0.5 to 20 parts, preferably from 1 to 5 parts by weight per 100 parts by weight of ingredient (1).

Ingredient (2) may be prepared, for example, by hydrolyzing phenylvinyldichlorosilane, then washing the hydrolyzate with water, followed by drying and cracking the product under reduced pressure in the presence of an alkali catalyst such as lithium hydroxide.

Ingredient (3) of the composition is what is called a reinforcing filler. It is prepared by treating silica having a specific surface area of at least 50 m²/g, which is usually used in the production of traditional dimethylpolysiloxane elastomers, in the presence of silane or siloxane. For the purpose of attaining the object of the invention, the treating agent should be particularly what is represented by the general formula:

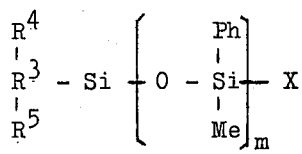

where $R^3$, $R^4$, $R^5$, Ph, Me, X and m are as defined before. Examples of the silanes are dimethylphenylchlorosilane, methyldiphenylchlorosilane, triphenylchlorosilane, dimethylpehnylsilanol, methyldiphenylsilanol, triphenylsilanol, dimethylphenylmethoxysilane, methyldiphenylmethoxysilane, methyldiphenylethoxysilane and triphenylmethoxysilane. Of these compounds, chlorosilanes may be prepared by the known Grignard's reaction, and silanols and alkoxysilanes by hydrolyzing or alkoxidizing the chlorosilanes. Further, examples of the siloxanes are 1,1,2-triphenyl-1,2-dimethyl-2-hydroxydisiloxane, 1,1,2-triphenyl-1,2,-dimethyl-2-methoxydisiloxane, 1,1,1,2-tetraphenyl-2-methyl-2-methoxydisiloxane, 1,1,2,3-tetraphenyl-2,3-dimethyl-3-methoxytrisiloxane, 1,1,2,3,4-pentaphenyl-2,3-dimethylethoxytetrasiloxane, 1,1,2,3,4-pentaphenyl-1,2,3,4-tetramethylmethoxytetrasiloxane and a phenylmethyl silicone fluid having silicon-bonded hydroxyl or hydrolyzable groups. These siloxanes are prepared by reacting the chlorosilanes with cyclic phenylmethylsiloxanes.

In order to treat the silica fillers with the silanes or siloxanes, the silica fillers are first dispersed in a nonpolar solvent such as toluene or xylene, so as to be dehydrated under reflux, and then they are brought into contact with the silanes or siloxanes in the presence of a condensing catalyst such as amines or metallic soap. It is not always necessary that the silane or siloxane should be chemically bonded to the surface of the silica but it may be absorbed by the silica physically, the amount of the silane or siloxane chemically bonded to or physically adsorbed by the silica being from 10 to 40% by weight based on the weight of the silica. The silica being a known reinforcing filler may be fume silica, precipitated silica or any other kind of silica provided only that it has a specific surface area of at least 50 m²/g.

Ingredient (3) should be added in an amount in the certain range relative to that of ingredient (1), that is, from 10 to 200 parts, preferably from 20 to 60 parts by weight per 100 parts by weight of ingredient (1). If it is smaller than what is prescribed, the reinforcing effect of ingredient (3) on the resulting elastomer would not be sufficient. On the other hand, if it is larger, there would be some difficulty in carrying out the mixing and milling step to this ingredient (3) initially with ingredient (1) and additionally with ingredient (2) to a satisfactory condition, and the resulting product would have very poor mechanical properties.

The organic peroxide ingredient (4) is what has hitherto been employed as a curing agent for silicone rubber. Its examples are ditertiarybutyl peroxide, benzoyl peroxide, 2,4-dichlorobenzoyl peroxide, tertiarybutyl perbenzoate, and dicumyl peroxide. The amount in which ingredient (4) is employed to attain the purpose of the invention may be a catalytic amount, or precisely from 0.1 to 5 parts, preferably from 0.5 to 3 parts by weight per 100 parts by weight of ingredient (1). It is preferred that the organic peroxide is mixed with a silicone fluid to make the form of paste and then added to the other ingredient to produce the composition of the invention.

The composition of the invention can be prepared merely by mixing the above-given ingredients (1), (2), (3) and (4). There is no particular order of mixing the ingredients, but usually ingredient (3) is added first to ingredient (1) and to this mixture is added ingredient (2), and the resulting material is added to a roll mill to produce a uniform mixture, to which is then added ingredient (4). To the composition thus prepared may be added any additives that are employed in the preparation of known silicone rubber compositions. They are metal compounds, such as, alumina, titanium white, zinc white, red iron oxide, calcium silicate, aluminum silicate, manganese borate; various pigments including carbon blacks; heat-resistance improvers such as fatty acid salts, oxides and carbonates of iron or of rare earths; and other flame-retardant agents. They may be employed in any amount considered necessary.

The following examples are illustrative of the practice of the present invention. These examples are not intended to restrict the scope of the invention. In the examples, parts are parts by weight, unless otherwise specified, and Me, Ph and Vi stand for methyl, phenyl and vinyl groups, respectively. All values denoting the physical properties herein were obtained in accordance with Japanese Industrial Standard JIS K 6301.

EXAMPLE 1

To 100 parts of organopolysiloxane gum having a polymerization degree of 5,000 and consisting of 12.0 mole % of $Ph_2SiO$ unit, 87.9 mole % of $Me_2SiO$ unit and 0.1 mole % of MeViSiO unit were added 1 part of cyclic phenylvinyltetrasiloxane and 44 parts of fume silica having a specific surface area of 200 m²/g and treated with 10% by weight of methyldiphenylsilanol based on the weight of the silica. The mixture was milled on a three roll mill, to produce a patty-like compound. To this compound was added silicone paste, containing 50% of benzoyl peroxide, in an amount of 1 part per 100 parts of the compound, followed by additional milling. The compound thus obtained was cured at 130°C under the pressure of 30 kg/cm² for 10 minutes, to produce a 1 mm thick sheet, followed by a secondary curing in a hot air oven at 200°C for 4 hours, to finally prepare silicone elastomer samples A-1.

For purposes of control, another silicone elastomer samples A-2 were prepared by the same procedure as above except that 44 parts of fume silica without the methyldiphenylsilanol treatment were used instead of 44 parts of the silane-treated fume silica and that no cyclic phenylvinyltetrasiloxane was used.

These silicone elastomer samples, A-1 and A-2, were exposed to 100 Mrad of γ-rays from cobalt-60. Elongation and tensile strength exhibited by each sample before and after the irradiation are shown in the following Table 1.

Table 1

| Sample | Elongation (%) | | Tensile strength (kg/cm²) | |
|---|---|---|---|---|
| | Before irradiation | After irradiation | Before irradiation | After irradiation |
| A-1 | 550 | 250 | 115 | 80 |
| A-2 | 350 | 100 | 100 | 80 |

Further, in the above-described example of the invention, 1 part of cyclic phenylvinyltrisiloxane was used in place of 1 part of cyclic phenylvinyltetrasiloxane. The resulting silicone elastomers were found to have about the same physical properties as obtained with the use of the cyclic phenylvinyltetrasiloxane.

EXAMPLE 2

To 100 parts of organosilicone gum having a polymerization degree of 5,000 and consisting of 30 mole % of Ph$_2$SiO unit, 69.7 mole % of Me$_2$SiO unit, and 0.3 mole % of MeViSiO unit were added 1 part of cyclic phenylvinyltetrasiloxane and 60 parts of fume silica having a specific surface area of 200 m²/g and treated with 33% by weight of methyldiphenylethoxysilane based on the weight of the silica. The mixture was milled on a three roll mill, to produce a patty-like compound. To this compound was added dicumyl peroxide in an amount of 0.5 part per 100 parts of the compound, followed by further milling. The compound thus obtained was cured at 170°C under the pressure of 30 kg/cm² for 10 minutes, to produce a 1 mm thick sheet, followed by a secondary curing in a hot air oven at 200°C for 4 hours, to finally prepare silicone elastomer samples B-1.

For purposes of control, another silicone elastomer samples B-2 were prepared by the same procedure as above except that 60 parts of fume silica without the methyldiphenylethoxysilane treatment were used instead of 60 parts of the silane-treated fume silica and that no cyclic phenylvinyltetrasiloxane was used.

These silicone elastomer samples, B-1 and B-2, were exposed to 100 Mrad or 50 Mrad of γ-rays from cobalt-60. Elongation and tensile strength exhibited by each sample before and after the irradiation are shown in the following Table 2.

Table 2

| Sample | Elongation | | | Tensile strength (kg/cm²) | | |
|---|---|---|---|---|---|---|
| | Before irradiation | After 100 Mrad irradiation | After 500 Mrad irradiation | Before irradiation | After 100 Mrad irradiation | After 500 Mrad irradiation |
| B-1 | 500 | 350 | 80 | 105 | 82 | 65 |
| B-2 | 550 | 250 | Broken | 85 | 83 | * |

* Too fragile to be put to the test.

EXAMPLE 3

Fume silica having a specific surface area of 200 m²/g was treated on the surface with 20% by weight, based on the weight of the silica, of phenylmethyl silicone fluid represented by the general formula

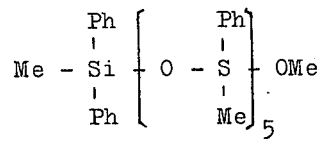

Subsequently, 50 parts of this fume silica and 2 parts of cyclic phenylvinyltetrasiloxane were added to 100 parts of organosiloxane gum having a polymerization degree of 5,000 and consisting of 60 mole % of MePhSiO unit, 39.7 mole % of Me$_2$SiO unit, and 0.3 mole % of MeViSiO unit. The mixture was milled on a three roll mill, to produce a patty-like compound. To this compound was added 1 part, per 100 parts of the compound, of dimethylsilicone fluid containing 50% of benzoyl peroxide, followed by further milling and curing in similar manners to Example 1, to finally prepare a 1 mm thick silicone elastomer sheet.

The sample pieces C from the silicone elastomer sheet were exposed to 100 Mrad or 500 Mrad of γ-rays from cobalt-60. The physical properties exhibited by the samples before and after the irradition are given in Table 3.

Table 3

| Sample | Elongation (%) | | | Tensile strength (kg/cm²) | | |
|---|---|---|---|---|---|---|
| | Before irradiation | After 100 Mrad irradiation | After 500 Mrad irradiation | Before irradiation | After 100 Mrad irradiation | After 500 Mrad irradiation |
| C | 480 | 300 | 103 | 95 | 87 | 60 |

EXAMPLE 4

To 100 parts of organopolysiloxane gum having a polymerization degree of 4,000 and consisting of 40.0 mole % of Ph$_2$SiO unit, 59.5 mole % of Me$_2$SiO unit and 0.5 mole % of MeViSiO unit were added 2 parts of cyclic phenylvinylsiloxane and 60 parts of fume silica having a specific surface area of 300 m$^2$/g and treated on the surface with 33% by weight of methyldiphenylsilanol based on the weight of the silica. The mixture was milled on a three roll mill into a compound, D–1. Compounds D–2 and D–3 were then prepared by re-milling the compound D–1 with the additions of 5 parts of acetylene black and 20 parts of manganese borate per 100 parts of compound D–1, respectively.

To each of compounds D–1, D–2 and D–3 was added 0.5 % by weight, based on the weight of the compound, of dicumyl peroxide. Each mixture was milled and presscured into a 1 mm thick sheet, which was then subjected to a secondary curing under the same conditions as described in Example 2. From these sheets of compounds D–1, D–2 and D–3 were prepared sample pieces D–1, D–2 and D–3, respectively.

These samples were exposed to 500 Mrad of γ-rays from cobalt-60. The physical properties exhibited by the samples before and after the irradiation are shown in Table 4.

Table 4

| Sample | Elongation (%) | | Tensile strength (kg/cm$^2$) | |
|---|---|---|---|---|
| | Before irradiation | After irradiation | Before irradiation | After irradiation |
| D-1 | 530 | 100 | 88 | 66 |
| D-2 | 500 | 103 | 85 | 58 |
| D-3 | 560 | 104 | 80 | 75 |

CONTROL

To 100 parts of organopolysiloxane gum having a polymerization degree of 5,000 and consisting of 42 mole % of Ph$_2$SiO unit, 57.7 mole % of Me$_2$SiO unit, and 0.3 mole % of MeViSiO unit were added 40 parts of fume silica having a specific surface area of 200 m$^2$/g. The mixture was milled on a three roll mill into a compound containing about the same amount of phenyl groups as in B–1. To this compound was further added 1 part, per 100 parts of the compound, of dimethylsilicone fluid containing 50 % of benzoyl peroxide, followed by further milling. Thereafter, in an attempt to cure the resulting compound, it was heated at 120°C for 10 minutes, but no curing took place at all. Consequently additional 2 parts of the above-given dimethylsilicone fluid were added to the compound, and this new mixture was processed into a sheet. The sheet was subjected to a secondary curing at 200°C for 4 hours, to produce a silicone elastomer sheet, having physical properties of 320% elongation and 50 kg/cm$^2$ tensile strength. However, when a sample from this sheet was exposed to 100 Mrad of γ-rays from bocalt-60, the elongation was reduced to 150%, and when another sample of the same sheet was exposed to 500 Mrad, it exhibited no elongation and became easily broken by tension.

What is claimed is:

1. A curable silicone rubber composition consisting essentially of 1. 100 parts by weight of an organopolysiloxane having a polymerization degree of at least 1,000, represented by the average formula

     $$R^1{}_a SiO_{4-a/2}$$

where R$^1$ is a monovalent hydrocarbon group, of which from 0.1 to 1.0 group per silicon atom is phenyl or halogenated phenyl, from 0.001 to 0.05 group per silicon atom is vinyl and the other group is alkyl, and a is a number of from 1.98 to 2.0, 2. from 0.5 to 20 parts by weight of a cyclic organopolysiloxane represented by the general formula

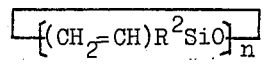
     $$\left[ (CH_2=CH)R^2 SiO \right]_n$$

where R$^2$ is a phenyl or halogenated phenyl group and n is an integer of from 3 to 6.

3. from 10 to 200 parts by weight of a silica filler having a specific surface area of at least 50 m$^2$/g, the surface of which has been treated with an organosilicon compound having the general formula

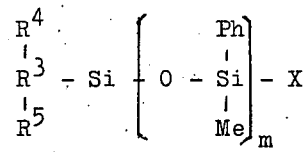

where R$^3$, R$^4$ and R$^5$ are the same or different saturated monovalent hydrocarbon groups, at least one of the R$^3$, R$^4$ and R$^5$ being a phenyl or halogenated phenyl group, Ph stands for phenyl, Me stands for methyl, m is an integer of from 0 to 10 and X is a hydroxyl or hydrolyzable group, and 4. a catalytic amount of an organic peroxide.

2. The curable silicone rubber composition as claimed in claim 1 wherein ingredient (2) is used in an amount of from 1 to 5 parts by weight based on 100 parts of ingredient (1).

3. The curable silicone rubber composition as claimed in claim 1 wherein ingredient (3) is used in an amount of from 20 to 60 parts by weight based on 100 parts of ingredient (1).

4. The curable silicone rubber composition as claimed in claim 1 wherein ingredient (2) is cyclic phenylmethyltetrasiloxane or cyclic phenylmethyltrisiloxane.

5. The curable silicone rubber composition as claimed in claim 1 wherein ingredient (3) is treated with at least one organosilicon compound selected from the group consisting of methyldiphenylsilanol, methyldiphenyl ethoxysilane, and phenylmethylsilicone fluid having silicon-bonded hydroxyl or hydrolyzable groups.

6. The curable silicone rubber composition as claimed in claim 1 wherein ingredient (3) is treated with an organosilicon compound in an amount of from 10 to 40 parts by weight, based on 100 parts by weight of ingredient (3).

7. The curable silicone rubber composition as claimed in claim 1 wherein ingredient (4) is an organic peroxide selected from the group consisting of ditertiarybutyl peroxide, benzoyl peroxide, 2,4-dichlorobenzoyl peroxide, tertiarybutyl perbenzoate and dicumyl peroxide.

8. The curable silicone rubber composition as claimed in claim 1 wherein ingredient (4) is used in an amount of from 0.1 to 5 parts by weight based on 100 parts by weight of ingredient (1).

9. A curable silicone rubber composition consisting essentially of
1. 100 parts by weight of an organopolysiloxane having a polymerization degree of at least 1,000, represented by the average formula $$R^1{}_a SiO_{4-a/2}$$

where $R^1$ is a monovalent hydrocarbon group, of which from 0.1 to 1.0 group per silicon is phenyl, from 0.001 to 0.05 group per silicon is vinyl and the other group is alkyl, and $a$ is a number of from 1.98 to 2.0, 2. from 1 to 5 parts by weight of cyclic phenylmethyltetrasiloxane or cyclic phenylmethyltrisiloxane,
3. from 20 to 60 parts by weight of a silica filler having a specific surface area of at least 50 m²/g, the surface of which has been treated with at least one organosilicon compound selected from the group consisting of methyldiphenylsilanol, methyldiphenylethoxysilane, and phenylmethylsilicone fluid having silicon-bonded hydroxyl or hydrolyzable groups, and
4. from 0.1 to 5 parts by weight of an organic peroxide.

10. The cured product of claim 1.

* * * * *